United States Patent
Shiue et al.

(10) Patent No.: US 9,288,357 B2
(45) Date of Patent: Mar. 15, 2016

(54) DUAL-SLOPE LIGHT GUIDE, LIGHT SOURCE MODULE AND OPTICAL ASSEMBLY FOR SCANNER

(71) Applicant: AVISION INC., Hsinchu (TW)

(72) Inventors: Shin Gwo Shiue, Hsinchu (TW); Sung-Po Cheng, Hsinchu (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 14/494,937

(22) Filed: Sep. 24, 2014

(65) Prior Publication Data

US 2015/0098118 A1    Apr. 9, 2015

(30) Foreign Application Priority Data

Oct. 9, 2013    (TW) .............................. 102136434 A (51) Int. Cl.
*H04N 1/04* (2006.01)
*H04N 1/028* (2006.01)
*F21V 8/00* (2006.01)

(52) U.S. Cl.
CPC ............ *H04N 1/02895* (2013.01); *G02B 6/001* (2013.01); *H04N 1/0288* (2013.01); *G02B 6/0038* (2013.01); *H04N 2201/02497* (2013.01)

(58) Field of Classification Search
CPC ............ H04N 1/02895; H04N 1/0288; H04N 2201/02497
USPC ................................. 358/475, 474, 498, 497
See application file for complete search history.

(56) References Cited

U.S. PATENT DOCUMENTS

| 5,575,549 | A | * | 11/1996 | Ishikawa | G02B 6/0025 362/330 |
| 5,584,556 | A | * | 12/1996 | Yokoyama | G02B 6/0036 349/62 |
| 5,779,337 | A |   | 7/1998 | Saito et al. | |
| 6,031,958 | A | * | 2/2000 | McGaffigan | 385/146 |
| 8,371,736 | B2 | * | 2/2013 | Inoue et al. | 362/610 |
| 2005/0179959 | A1 |   | 8/2005 | Lien | |

FOREIGN PATENT DOCUMENTS

| TW | 200527897 |   | 8/2005 |
| TW | M336394 | U | 7/2008 |
| TW | 201326977 | A | 7/2013 |

* cited by examiner

*Primary Examiner* — Houshang Safaipour (57) ABSTRACT

A dual-slope light guide includes a first surface, a second surface and a curved surface. The first surface has first reflecting structures. The second surface, connected to the first surface, has second reflecting structures. An included angle between the first surface and the second surface is unequal to 180 degrees. The curved surface connects the first surface to the second surface. The first surface, the second surface and the curved surface extend from a first end of the light guide to a second end of the light guide. A light beam incident to the first end of the light guide is reflected and converted by the first reflecting structure and the second reflecting structure into linear light emitted from the curved surface. A light source module and an optical assembly for a scanner are also disclosed.

15 Claims, 8 Drawing Sheets

DUAL-SLOPE LIGHT GUIDE, LIGHT SOURCE MODULE AND OPTICAL ASSEMBLY FOR SCANNER

This application claims priority of No. 102136434 filed in Taiwan R.O.C. on Oct. 9, 2013 under 35 USC 119, the entire content of which is hereby incorporated by reference.

BACKGROUND OF THE INVENTION

1. Field of the Invention

The present invention relates to a dual-slope light guide and a light source module and an optical assembly for a scanner, and more particularly to a light guide having a dual-slope reflecting surface, and a light source module and an optical assembly, using the light guide, for a scanner.

2. Related Art

Light-emitting diodes (LED) have the advantages of the high energy conversion efficiency, the power-saving property, the long lifetime and the small size, and have been widely applied to various light sources. For a scanner, a light beam emitted from the LED is point light, which needs to be converted by a light guide into linear light so that the illumination light beam required to scan an original can be provided.

The typical light guide has the object of guiding the light. The light guiding principle is to utilize the V-shaped grooves on the top surface to reflect or refract the light beams emitted from two ends to the top surface from which the light is to be outputted, so that the desired light beam is outputted from the top surface. This transversally extended and longitudinally arranged V-shaped grooves only can let the designer adjust the longitudinal light property of the light guide, but cannot let the designer adjust the transversal light property of the light guide. Thus, the increasingly stringent requirements or the diversified requirements, such as the response curve of the image sensor, cannot be satisfied.

SUMMARY OF THE INVENTION

Accordingly, the present invention has been proposed to solve the problems of the prior art, and it is an object of the present invention to provide a dual-slope light guide and a light source module and an optical assembly for a scanner, wherein the dual sloped surfaces of the light guide are formed with triangular pyramidal or columnar chambers or entities to serve as the reflecting structures and facilitate the designer in adjusting the light emitting property and the light beam luminance curve of the light source module by adjusting the parameters of the dual sloped surfaces and the triangular pyramidal or columnar chambers or entities. Thus, the requirements of various products on the light source luminance can be satisfied.

To achieve the above-identified object, the present invention provides a dual-slope light guide comprising a first surface, a second surface and a curved surface. The first surface has first reflecting structures. The second surface is connected to the first surface and has second reflecting structures. An included angle between the first surface and the second surface is unequal to 180 degrees. The curved surface connects the first surface to the second surface. The first surface, the second surface and the curved surface extend from a first end of the light guide to a second end of the light guide. A light beam incident to the first end of the light guide is reflected and converted by the first reflecting structure and the second reflecting structure into linear light emitted from the curved surface.

The present invention also provides a light source module comprising a holder, the light guide, a first light emitting element and a second light emitting element. The dual-slope light guide is mounted on the holder, and the holder partially covers the light guide. The first light emitting element and the second light emitting element are disposed near the first end and the second end of the light guide, respectively, and emit light beams into the light guide.

The present invention further provides an optical assembly comprising a housing, the light source module, a reflecting mirror module, a lens and an image sensor. The light source module is mounted on the housing. The reflecting mirror module, the lens and the image sensor are disposed in the housing. The light source module illuminates the linear light on an original. Light beams reflected by the original are reflected by the reflecting mirror module through the lens and reach the image sensor, and the image sensor obtains an optical signal representing an image of the original.

With the dual-slope light guide and the light source module and the optical assembly for the scanner according to the present invention, the dual sloped surfaces of the light guide are formed with triangular pyramidal or columnar chambers or entities to serve as the reflecting structures. In addition to the changeable reflecting structures arranged longitudinally, the reflecting structures extending transversally may also be changed. Compared with the conventional arrangement, in which the V-shaped grooves are arranged in the single direction, the present invention has the powerful ability of adjusting the light source in a finer and gradually changing manner. Thus, the straight-line image, caused by the rapid change in the brightness, can be eliminated, or even the nonuniform phenomenon may be eliminated. This is helpful to the enhancement of the scan quality.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to the accompanying drawings.

Figure 1:
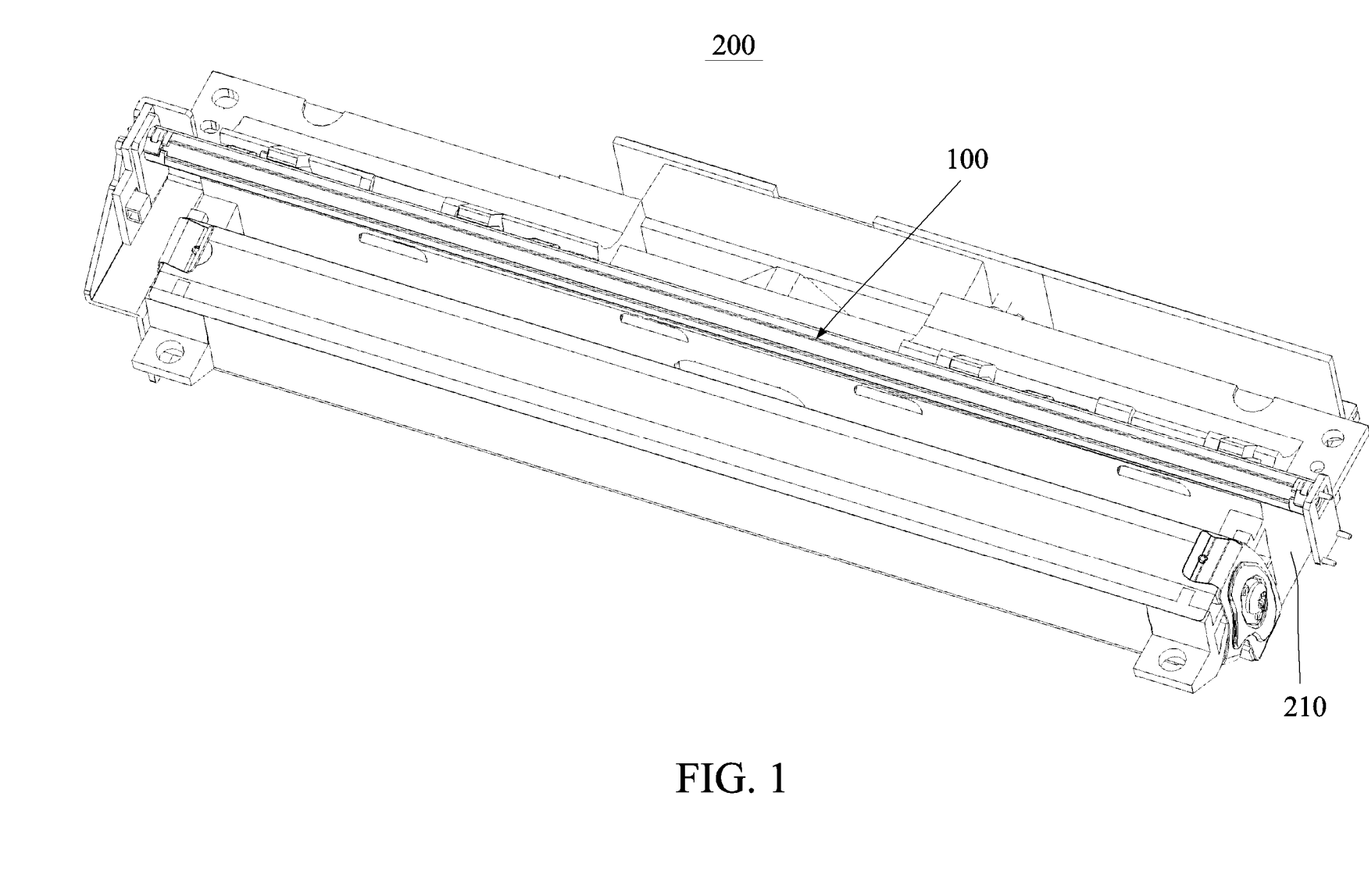
FIG. 1 shows a pictorial view of an optical assembly according to a first embodiment of the present invention.
Figure 2:
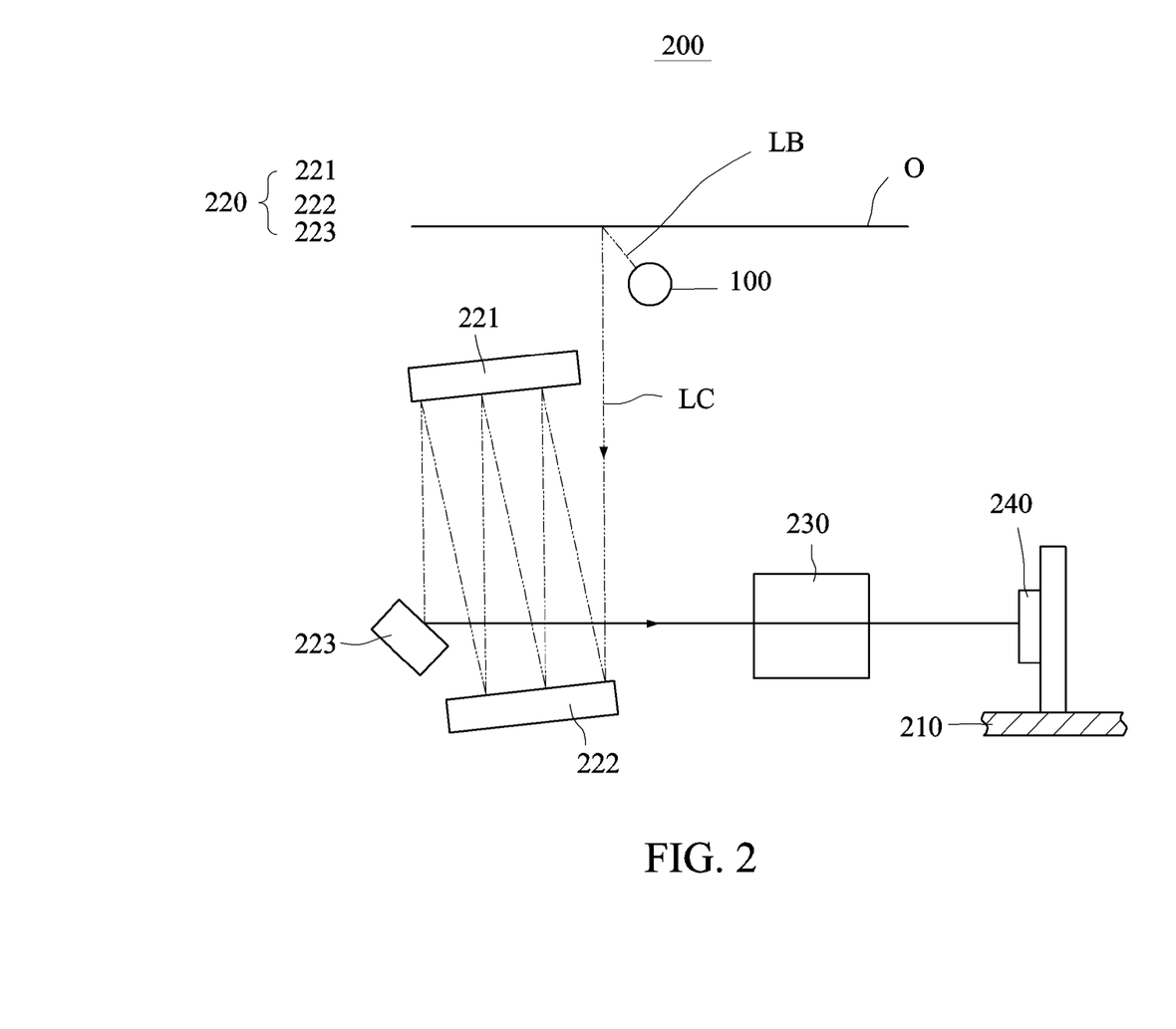
FIG. 2 shows a schematic view of an arrangement of the optical assembly of FIG. 1.

FIG. 1 shows a pictorial view of an optical assembly 200 according to a first embodiment of the present invention. FIG. 2 shows a schematic view of an arrangement of the optical assembly 200 of FIG. 1. Referring to FIGS. 1 and 2, the optical assembly 200 of this embodiment comprises a housing 210, a light source module 100, a reflecting mirror module 220, a lens 230 and an image sensor 240.

The light source module 100, mounted on the housing 210, provides linear light LB. The reflecting mirror module 220, the lens 230 and the image sensor 240 are disposed in the housing 210. In this embodiment, the reflecting mirror module 220 including three reflecting mirrors 221, 222 and 223 will be described as an example, which does not intend to restrict the present invention thereto, wherein the number of the reflecting mirrors may be increased or decreased properly, or even a single reflecting mirror may be used to implement this invention. The light source module 100 illuminates the linear light LB on an original O, and a light beam LC reflected by the original O is reflected by the reflecting mirror module 220 through the lens 230 and reaches the image sensor 240, and the image sensor 240 obtains an optical signal representing an image of the original O. That is, after the linear light LB illuminates on the original O, the linear light LB is reflected by the original O to the reflecting mirror 222 and then reflected and travels between the reflecting mirrors 222 and 221 several times. Finally, the reflecting mirror 222 reflects the light to the image sensor 240 through the lens 230. In this embodiment, the image sensor 240 is a charge-coupled device (CCD) type image sensor.

Figure 3:
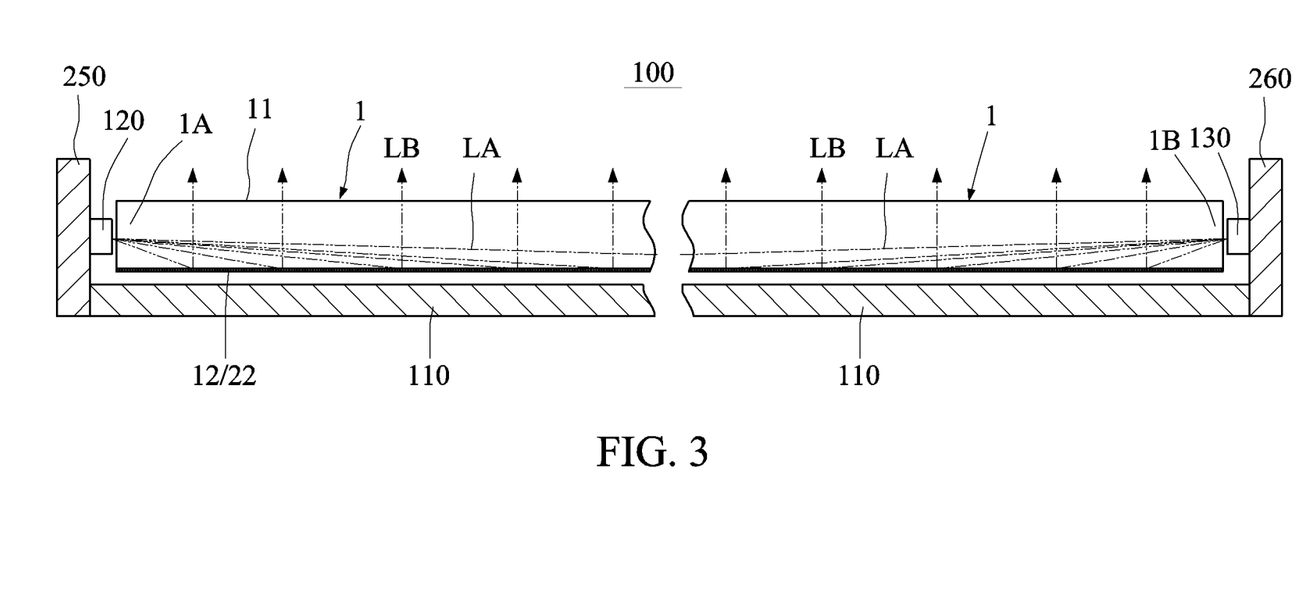
FIG. 3 shows a front view of a light source module of FIG. 1.

FIG. 3 shows a front view of the light source module 100 of FIG. 1. Referring to FIG. 3, the light source module 100 of this embodiment includes a holder 110, a light guide 1, a first light emitting element 120 and a second light emitting element 130.

In this embodiment, LEDs serve as exemplified but non-restrictive examples of the first light emitting element 120 and the second light emitting element 130. The first light emitting element 120 and the second light emitting element 130 are disposed on two side plates 250 and 260 of the optical assembly 200, respectively. The two side plates 250 and 260 are mounted on the housing 210 and connected to the holder 110. The light guide 1 is mounted on the holder 110. The holder 110 partially covers the light guide 1. The first light emitting element 120 and the second light emitting element 130 abut the first end 1A and the second end 1B of the light guide 1 and emit light beams LA into the light guide 1. The light beams LA, emitted from the first light emitting element 120 and the second light emitting element 130, are reflected and converted by the light guide 1 into the linear light LB emitted from a light output surface 11.

Figure 4:
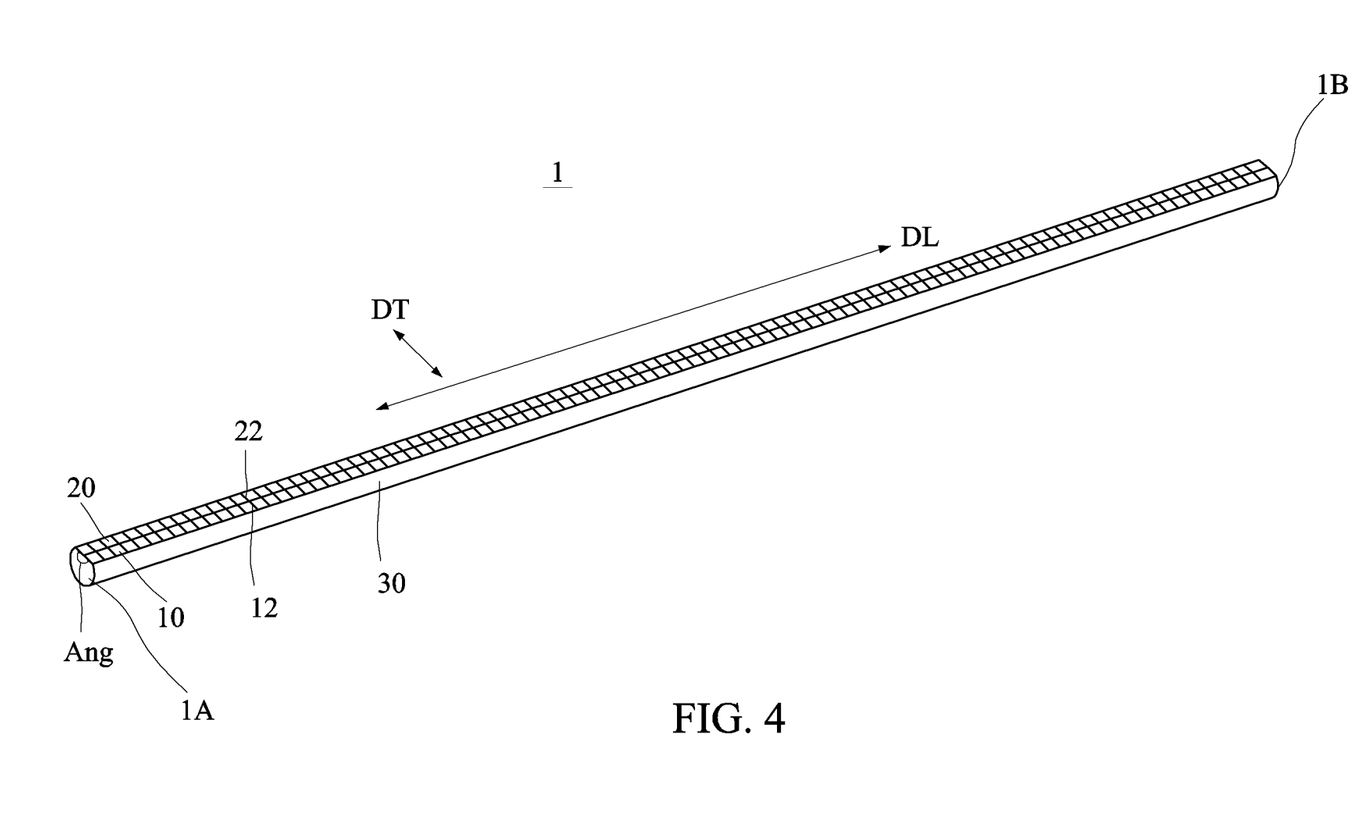
FIG. 4 shows a pictorial view of the light guide of FIG. 3.

FIG. 4 shows a pictorial view of the light guide of FIG. 3. Referring to FIG. 4, the light guide 1 of this embodiment comprises a first surface 10, a second surface 20 and a curved surface 30.

The first surface 10 has first reflecting structures 12 respectively arranged in a longitudinal DL from the first end 1A to the second end 1B. The second surface 20, directly connected to the first surface 10, has second reflecting structures 22 respectively arranged in the longitudinal direction DL. Also, edges 12E of the first reflecting structures 12 and edges 22E of the second reflecting structures 22 are arranged in the longitudinal direction DL, and are directly connected to a connection portion C3 between the first surface 10 and the second surface 20. An included angle Ang between the first surface 10 and the second surface 20 is unequal to 180 degrees. That is, the first surface 10 and the second surface 20 are not coplanar. In this embodiment, the included angle Ang is smaller than 180 degrees, and preferably ranges between 160 degrees and 175 degrees, such as 170 degrees. Thus, the first surface 10 and the second surface 20 constitute the dual sloped surface. It is to be noted that the first reflecting structures 12 are separately arranged in a longitudinal direction DL, and the second reflecting structures 22 are separately arranged in the longitudinal direction DL according to another definition in another embodiment.

As shown in FIGS. 3 and 4, the curved surface 30 directly connects the first surface 10 to the second surface 20. In this exemplified but non-restrictive embodiment, the curved surface 30 is a circular arc surface. The first surface 10, the second surface 20 and the curved surface 30 extend from the first end 1A of the light guide 1 to the second end 1B of the light guide 1. The light beam LA incident to the first end 1A of the light guide 1 is reflected and converted by the first reflecting structure 12 and the second reflecting structure 22 into the linear light LB outputted from the curved surface 30. One portion of the curved surface 30 functions as the light output surface 11 of FIG. 3.

Figure 5:
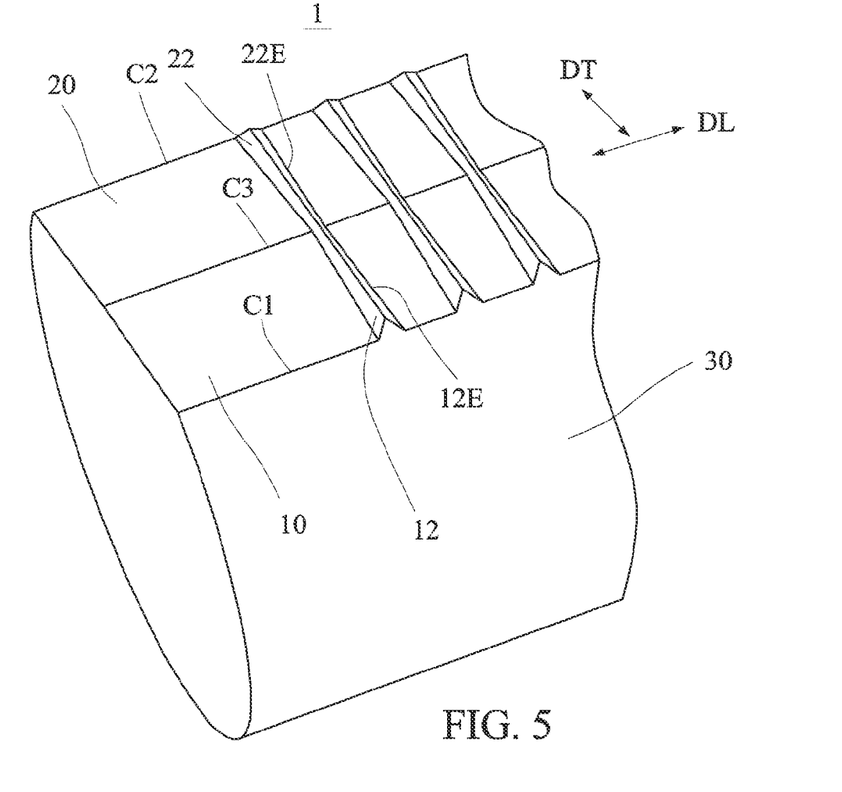
FIG. 5 shows an enlarged partial view of the light guide of FIG. 4.
Figure 6:
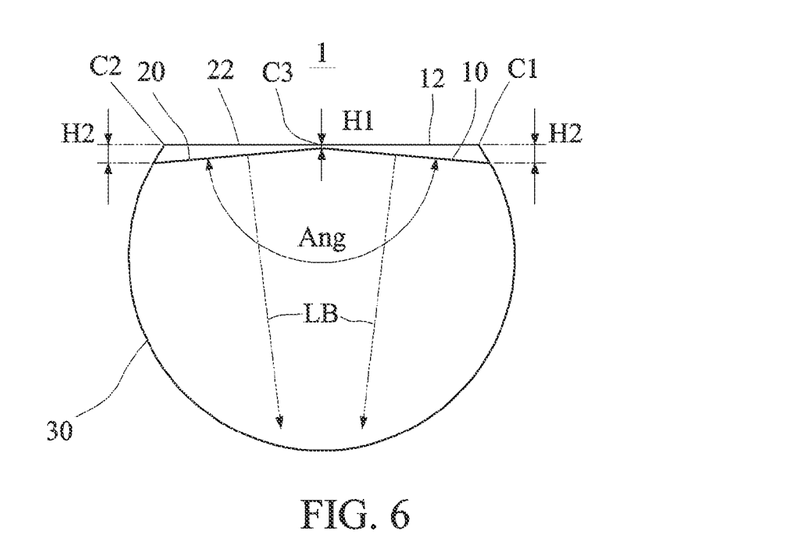
FIG. 6 shows a side view of the light guide of FIG. 5.

FIG. 5 shows an enlarged partial view of the light guide 1 of FIG. 4. FIG. 6 shows a side view of the light guide 1 of FIG. 5. Referring to FIGS. 5 and 6, each of the first reflecting structures 12 and the second reflecting structures 22 has a V-shaped structure, wherein the V-shaped structure defines a triangular pyramidal entity. The V-shaped structure of each first reflecting structure 12 is tapered from a connection portion C1 (in the form of a straight line) between the first surface 10 and the curved surface 30 to a connection portion C3 (in the form of a straight line) between the first surface 10 and the second surface 20. The V-shaped structure of each second reflecting structure 22 is tapered from a connection portion C2 (in the form of a straight line) between the second surface 20 and the curved surface 30 to the connection portion C3 between the first surface 10 and the second surface 20. That is, the height H1 of the triangular pyramidal entity near the connection portion C3 is smaller than the height H2 of the triangular pyramidal entity near the connection portion C1 and the connection portion C2, thereby providing a reflecting structure of a diamond pyramid. In addition, each first reflecting structure 12 and each second reflecting structure 22 substantially extend in the transversal direction DT. Because the included angle Ang is smaller than 180 degrees, the linear light LB reflected from the reflecting structure 12/22 is converged. Thus, the light beam in the transversal direction DT has the uniform luminance according to the design, in which the height H1 of the V-shaped structure near the reflecting structure 12/22 of the connection portion C3 is smaller than the height H2 of the V-shaped structure near the reflecting structure 12/22 of the connection portion C1/C2.

Figure 7:
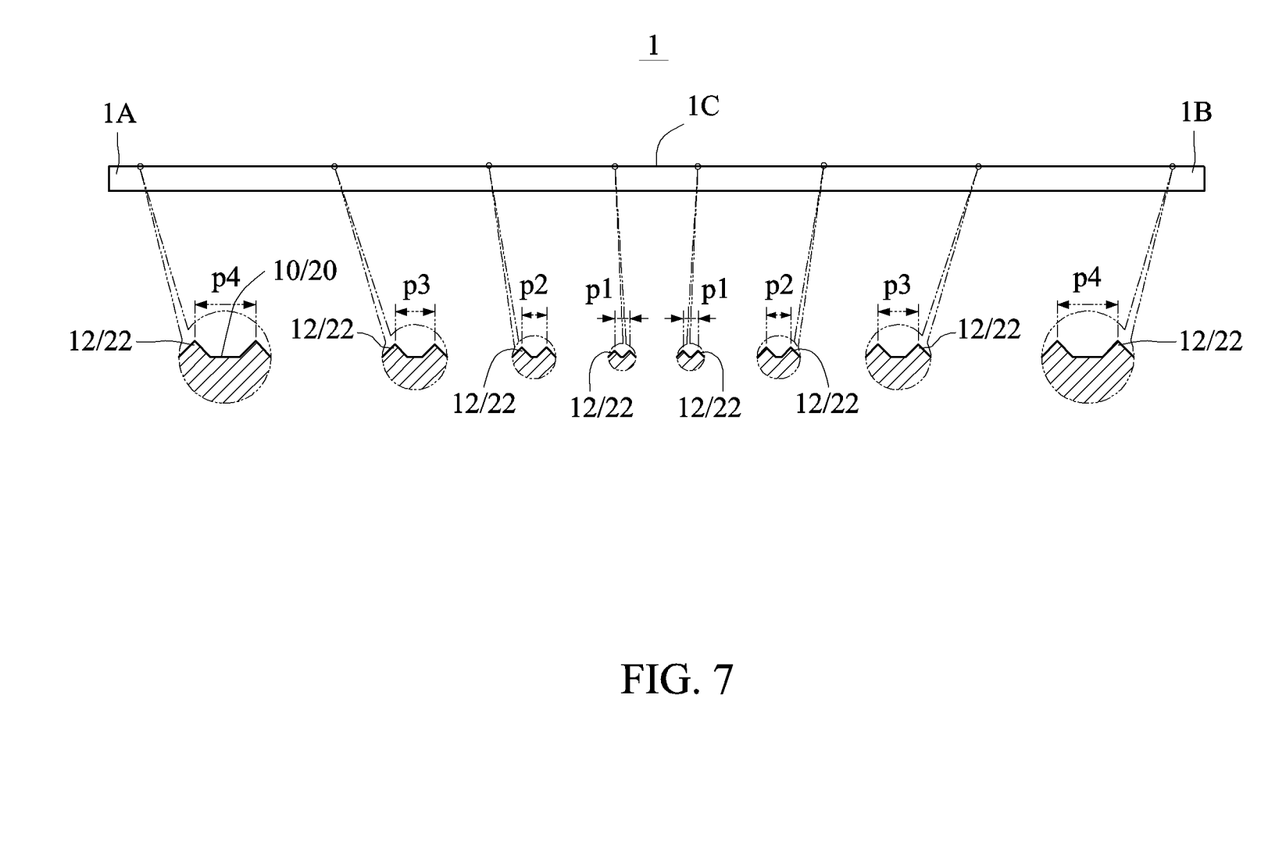
FIG. 7 shows a front view and enlarged partial views of the light guide of FIG. 3.

FIG. 7 shows a front view and enlarged partial views of the light guide 1 of FIG. 3. As shown in FIG. 7, the dimension of the V-shaped structure (the reflecting structure 12/22 on the left and right sides of the drawing) near the first end 1A or the second end 1B of the light guide 1 is greater than the dimension of the V-shaped structure (the middle reflecting structure 12/22 in the drawing) near a middle portion 1C between the first end 1A and the second end 1B of the light guide 1. In addition, the pitch of the V-shaped structures near the first end 1A or the second end 1B of the light guide 1 is greater than the pitch of the V-shaped structures near the middle portion 1C between the first end 1A and the second end 1B of the light guide 1. For example, the pitches satisfy p4>p3>p2>p1. Furthermore, the first reflecting structures 12 and the second reflecting structures 22 are symmetric about the middle portion 1C.

In one example, the heights of the reflecting structure 12/22 of FIG. 7 are sequentially 0.1 mm, 0.08 mm, 0.06 mm, 0.05 mm, 0.06 mm, 0.08 mm and 0.1 mm from left to right; and the pitches p4, p3, p2, p1 are 0.6 mm, 0.5 mm, 0.4 mm and 0.3 mm, respectively.

Thus, this embodiment utilizing the V-shaped gradually changing reflecting structures on the dual sloped surfaces enables the designer to effectively adjust the longitudinal and transversal light diffusing conditions and to comprehensively adjust the light intensity. The dimension of the pitch of the V-shaped structures affects the longitudinal light diffusing effect, and the dual sloped surface affects the light pattern to enhance the reflective efficiency. The height change of the V-shaped structures on the dual-slope can broaden the light pattern on the light source on the transversal direction DT. Because the light source is sufficiently bright on the connection portion C3 between the dual sloped surfaces, the reflecting structures of the connection portions C1 and C2 are deepened or heightened to adjust the width of the light pattern and compensate for the light beams on two sides to possess the uniformity of the light source. In one example, the intensities of the light beams on two ends of the light guide may be stronger than that of the light beam on the middle portion of the light guide to match with the response curve (e.g., a "smile" curve) of the image sensor. In another example, the intensity of the light beam of the light guide is uniform in the longitudinal direction. In still another example, the reflecting structures on the dual sloped surfaces (the included angle Ang therebetween is smaller than 180 degrees) can converge the light beams. Thus, the designer needs not to be restricted by the reflecting structures on the single surface of the prior art, and there are other design parameters can be adjusted to satisfy various requirements.

Figure 8:
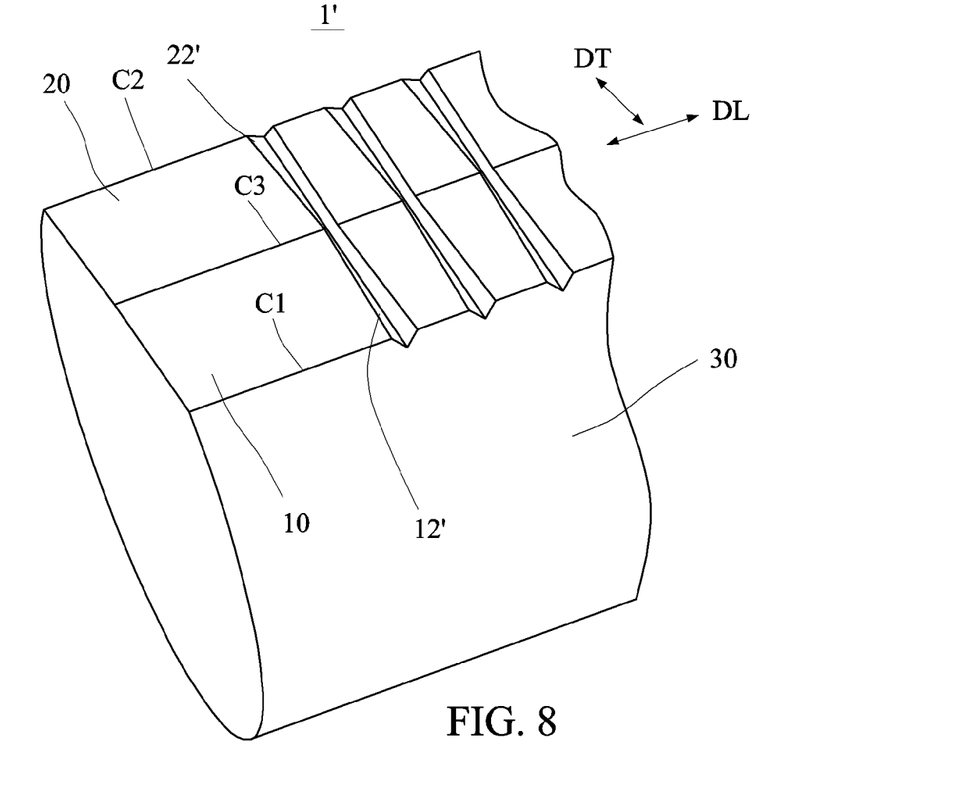
FIG. 8 shows an enlarged partial view of a light guide according to a second embodiment of the present invention.
Figure 9:
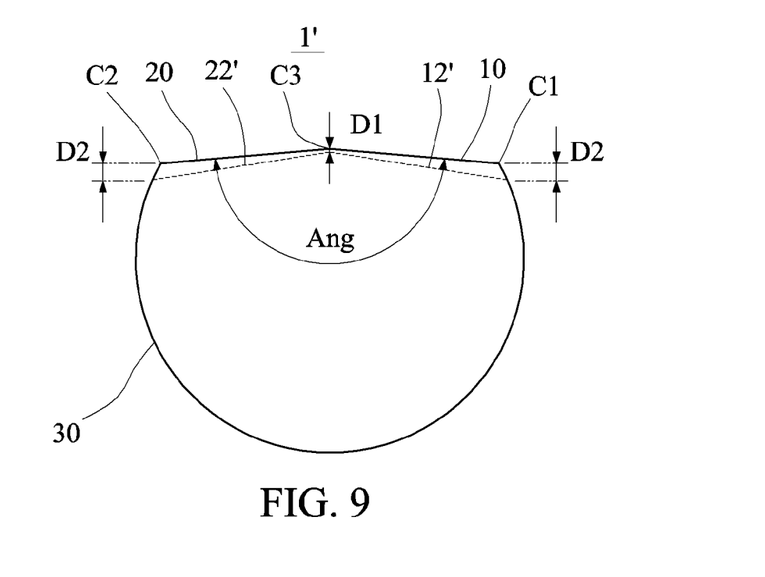
FIG. 9 shows a side view of the light guide of FIG. 8.

FIG. 8 shows an enlarged partial view of a light guide 1' according to a second embodiment of the present invention. FIG. 9 shows a side view of the light guide 1' of FIG. 8. This embodiment is similar to the first embodiment except that the V-shaped structure of each of the first reflecting structures 12' and the second reflecting structures 22' defines a triangular pyramidal chamber, wherein the triangular pyramidal chamber of the first reflecting structure 12' is tapered from the connection portion C1 to the connection portion C3, and the triangular pyramidal chamber of the second reflecting structure 22' is tapered from the connection portion C2 to the connection portion C3. That is, the depth D1 of each triangular pyramidal chamber near the connection portion C3 is smaller than the depth D2 near the connection portion C1 and the connection portion C2. The triangular pyramidal chamber or entity can achieve the effect of the present invention and can be advantageously selected according to the manufacturing method.

Figure 10:
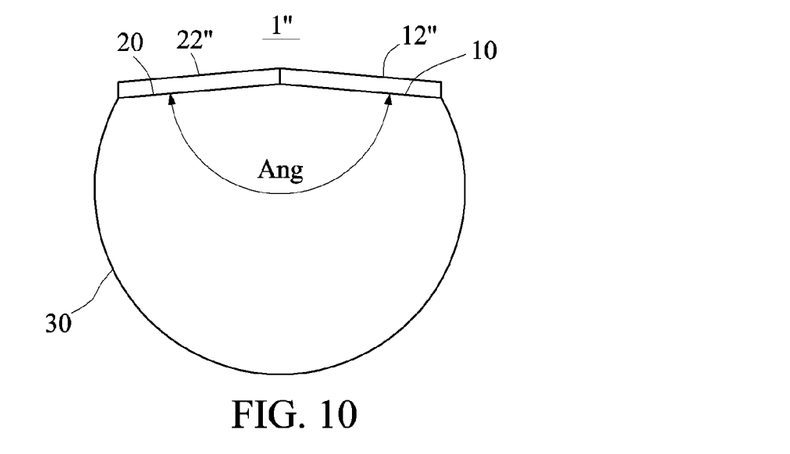
FIG. 10 shows a side view of a light guide according to the third embodiment of the present invention.
Figure 11:
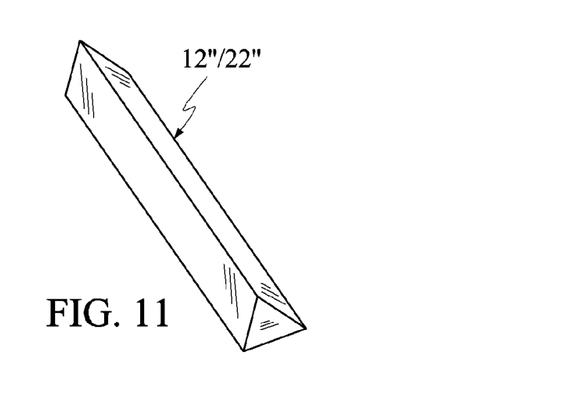
FIG. 11 shows a pictorial view of the reflecting structure of FIG. 10.

FIG. 10 shows a side view of a light guide 1" according to the third embodiment of the present invention. FIG. 11 shows a pictorial view of the reflecting structure 12"/22" of FIG. 10. As shown in FIGS. 10 and 11, the V-shaped structure of each of the first reflecting structures 12" and the second reflecting structures 22" defines a triangle columnar entity. The triangle columnar entity has the high structural strength and the low manufacturing cost when the required specification of the linear light LB is satisfied.

Figure 12:
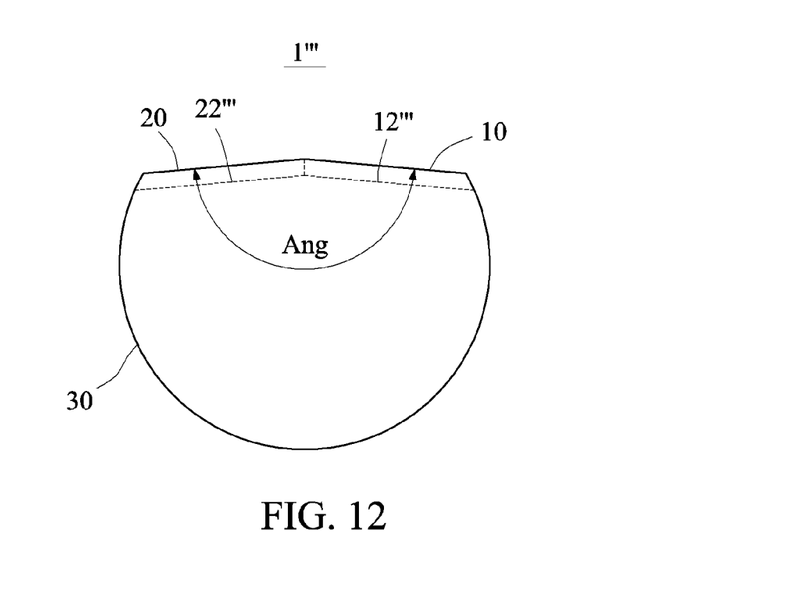
FIG. 12 shows a side view of a light guide according to a fourth embodiment of the present invention.

FIG. 12 shows a side view of a light guide 1''' according to a fourth embodiment of the present invention. As shown in FIG. 12, this embodiment is similar to the third embodiment except that the V-shaped structure of each of the first reflecting structures 12''' and the second reflecting structures 22''' defines a triangle columnar chamber (no detailed structure is depicted because the chamber is similar to the entity of FIG. 10). The triangle columnar chamber has the high structural strength and the low manufacturing cost when the required specification of the linear light LB is satisfied.

With the dual-slope light guide and the light source module and the optical assembly for the scanner according to the present invention, the dual sloped surfaces of the light guide are formed with triangular pyramidal or columnar chambers or entities to serve as the reflecting structures. In addition to the changeable reflecting structures arranged longitudinally, the reflecting structures extending transversally may also be changed. Compared with the conventional arrangement, in which the V-shaped grooves are arranged in the single direction, the present invention has the powerful ability of adjusting the light source in a finer and gradually changing manner. Thus, the straight-line image, caused by the rapid change in the brightness, can be eliminated, or even the nonuniform phenomenon may be eliminated. This is helpful to the enhancement of the scan quality.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A dual-slope light guide, comprising:
a first surface having first reflecting structures; and
a second surface, which is directly connected to the first surface and has second reflecting structures, wherein:
an included angle between the first surface and the second surface is unequal to 180 degrees; and
a curved surface directly connecting the first surface to the second surface, wherein the first surface, the second surface and the curved surface extend from a first end of the dual-slope light guide to a second end of the dual-slope guide, and a light beam incident to the first end of the dual-slope light guide is reflected and converted by the first reflecting structure and the second reflecting structure into linear light emitted from the curved surface, wherein the first reflecting structures are separately arranged in a longitudinal direction from the first end of the dual-slope light guide to the second end of the dual-slope light guide, and edges of the first reflecting structures and edges of the second reflecting structures are arranged in the longitudinal direction, wherein
each of the first reflecting structures and the second reflecting structures has a V-shaped Structure, the V-shaped structure defines a triangular pyramidal chamber or entity, and the triangular pyramidal chamber or entity is tapered from a connection portion between the first surface and the curved surface and a connection portion between the second surface and the curved surface to a connection portion between the first surface and the second surface.

2. The dual-slope light guide according to claim 1, wherein light beams incident to the first end and the second end of the dual-slope light guide are reflected and converted by the first reflecting structure and the second reflecting structure into linear light emitted from the curved surface.

3. The dual-slope light guide according to claim 1, wherein a dimension of the V-shaped structure near the first end or the second end of the dual-slope light guide is greater than a dimension of the V-shaped structure near a middle portion between the first end and the second end of the dual-slope light guide.

4. The dual-slope light guide according to claim 1, wherein a pitch of the V-shaped structures near the first end or the second end of the dual-slope light guide is greater than a pitch of the V-shaped structures near a middle portion between the first end and the second end of the dual-slope light guide.

5. The dual-slope light guide according to claim 1, wherein the first reflecting structure is symmetric about a middle portion between the first end and the second end of the dual-slope light guide, and the second reflecting structure is symmetric about the middle portion.

6. The dual-slope light guide according to claim 1, wherein the included angle ranges between 160 degrees and 175 degrees.

7. A light source module, comprising:
a holder;
the dual-slope light guide according to claim 1, wherein the dual-slope light guide is mounted on the holder, and the holder partially covers the dual-slope light guide; and
a first light emitting element and a second light emitting element, which are disposed near the first end and the second end of the dual-slope light guide, respectively, and emit light beams into the dual-slope light guide.

8. An optical assembly, comprising:
a housing;
the light source module according to claim 7, mounted on the housing; and
a reflecting mirror module, a lens and an image sensor disposed in the housing, wherein the light source module illuminates the linear light on an original, light beams reflected by the original are reflected by the reflecting mirror module through the lens and reach the image sensor, and the image sensor obtains an optical signal representing an image of the original.

9. An optical assembly, comprising:
a housing;
a light source module mounted on the housing, wherein the light source module comprises:
a holder;
a dual-slope light guide, comprising:
a first surface having first reflecting structures; and
a second surface which is directly connected to the first surface and has second reflecting structures, wherein:
an included angle between the first surface and the second surface is unequal 180 degrees: and
a curved surface directly connecting the first surface to the second surface, wherein the first surface, the second surface and the curved surface extend from a first end of the dual-slope light guide to a second end of the dual-slope light guide, and a light beam incident to the first end of the dual-slope light guide is reflected and converted by the first reflecting structure and the second reflecting structure into linear light emitted from the curved surface, wherein the first reflecting structures are separately arranged in a longitudinal direction from the first end of the dual-slope light guide to the second end of the dual-slope light guide, and edges of the first reflecting structures and edges of the second reflecting structures are arranged in the longitudinal direction, wherein the dual-slope light guide is mounted on the holder and the holder partially covers the dual-slope light guide; and
a first light emitting element and a second light emitting element, which are disposed near the first end and the second end of the dual-slope light guide, respectively, and emit light beams into the dual-slope light guide; and
a reflecting mirror module, a lens and an image sensor dispose in the housing, wherein the light source module illuminates the linear light on an original, light beams reflected by the original are reflected by the reflecting mirror module through the lens and reach the image sensor, and the image sensor obtains an optical signal representing an image of the original, wherein intensities of light beams of the light source module match with a response curve of the image sensor.

10. The dual-slope light guide according to claim 1, wherein the second reflecting structures are separately arranged in the longitudinal direction.

11. The dual-slope light guide according to claim 1, wherein the connection portion between the first surface and the curved surface is a straight line extending in the longitudinal direction.

12. The dual-slope light guide according to claim 1, wherein the connection portion between the second surface and the curved surface is a straight line extending in the longitudinal direction.

13. The dual-slope light guide according to claim 1, wherein the connection portion between the first surface and the second surface is a straight line extending in the longitudinal direction.

14. The dual-slope light guide according to claim 1, wherein the edges of the first reflecting structures and the edges of the second reflecting structures are directly connected to the connection portion between the first surface and the second surface, and the connection portion between the first surface and the second surface is a straight line extending in the longitudinal direction.

15. An optical assembly, comprising:
a housing;
a light source module mounted on the housing, wherein the light source module comprises:
a holder;
a dual-slope light guide, comprising:
a first surface having first reflecting structures; and
a second surface, which is directly connected to the first surface and has second reflecting structures, wheretn:
an included angle between the first surface and the second surface is unequal to 180 degrees; and
a curved surface directly connecting the first surface to surface, wherein the first surface, the second surface and the curved surface extend from a first end of the dual-slope light guide to a second end of the dual-slope light guide, and a light beam incident to the first end of the dual-slope light guide is reflected and converted by the first reflecting structure and the second reflecting structure into linear light emitted from the curved surface, wherein the first reflecting structures are respectively arranged in a longitudinal direction from the first end of the dual-slope light guide to the second end of the dual-slope light guide, and edges of the first reflecting structures and edges of the second reflecting structures are arranged in the longitudinal direction, wherein the dual-slope light guide is mounted on the holder, and the holder partially covers the dual-slope light guide; and a first light emitting element and a second light emitting element, which are disposed near the first end and the second end of the dual-slope light guide, respectively, and emit light beams into the dual-slope light guide; and a reflecting mirror module, a lens and an image sensor disposed in the housing, wherein the light source module illuminates the linear light on an original, light beams reflected by the original are reflected by the reflecting mirror module through the lens and reach the image sensor, and the image sensor obtains an optical signal representing an image of the original, wherein intensities of light beams of the light source module match with a response curve of the image sensor.

* * * * *